United States Patent
Kim et al.

(10) Patent No.: US 9,505,348 B1
(45) Date of Patent: *Nov. 29, 2016

(54) VARIABLE MAGNETIC BREAK-AWAY MOUNTING MECHANISM

(71) Applicant: Google Inc., Mountain View, CA (US)

(72) Inventors: Robert Kim, Mountain View, CA (US); Kenneth Ryan Loo, Sunnyvale, CA (US); David Gordon Duff, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,935

(22) Filed: Nov. 20, 2015

Related U.S. Application Data

(63) Continuation of application No. 14/526,947, filed on Oct. 29, 2014, now Pat. No. 9,221,397.

(60) Provisional application No. 61/989,798, filed on May 7, 2014.

(51) Int. Cl.
    *G02B 7/18* (2006.01)
    *B60R 1/00* (2006.01)
    *F16M 13/02* (2006.01)
    *F16B 1/00* (2006.01)

(52) U.S. Cl.
    CPC ............... *B60R 1/006* (2013.01); *F16B 1/00* (2013.01); *F16M 13/022* (2013.01); *F16B 2001/0035* (2013.01)

(58) Field of Classification Search
    CPC ............ B60R 1/006; B60R 1/025; B60R 2011/0057; B60R 2011/007
    USPC ............. 248/206.5, 683, 309.1, 346.01; 359/843, 846, 871, 872, 903
    See application file for complete search history.

(56) References Cited

U.S. PATENT DOCUMENTS

| | | | |
|---|---|---|---|
| 8,973,881 B2* | 3/2015 | Mihajlovic | F21S 6/001 206/303 |
| 9,221,397 B1* | 12/2015 | Kim | F16M 11/12 |
| 2007/0263301 A1* | 11/2007 | Agrest | B60R 1/025 359/843 |
| 2011/0157730 A1* | 6/2011 | Lewis | B60R 1/006 359/843 |

OTHER PUBLICATIONS

"Towing mirrors for caravans, trailers, boats rear view cameras", Ora Products, © 2014, <http://www.oraproducts.com.au/enzo.htm>.

(Continued)

*Primary Examiner* — Todd M Epps
(74) *Attorney, Agent, or Firm* — Lerner, David, Littenberg, Krumholz & Mentlik, LLP

(57) ABSTRACT

Aspects of the present disclosure relate to an apparatus providing a first component having a circular opening with an interior chamfered edge and a second component positioned within the circular opening. The apparatus also provides a magnetic feature at a circular bottom surface of the first component, where the magnetic feature provides a magnetic pull force in a first direction to secure the second component within the circular opening. The second component is configured to break away from the circular opening when a contact force to the breakaway component causes a force in a second direction opposite of the first direction and greater than the magnetic pull force.

20 Claims, 10 Drawing Sheets

(56) References Cited

OTHER PUBLICATIONS

Projects.magnetic-car-mirror—sleepygeek.org, 5 pages, printed Sep. 5, 2014, <http://sleepygeek.org/projects.magnetic-car-mirror>.

* cited by examiner

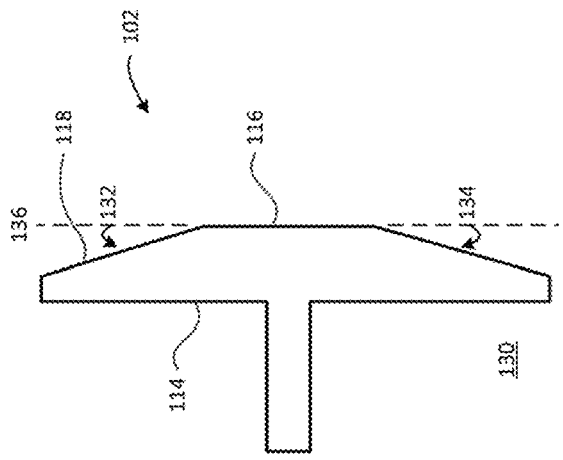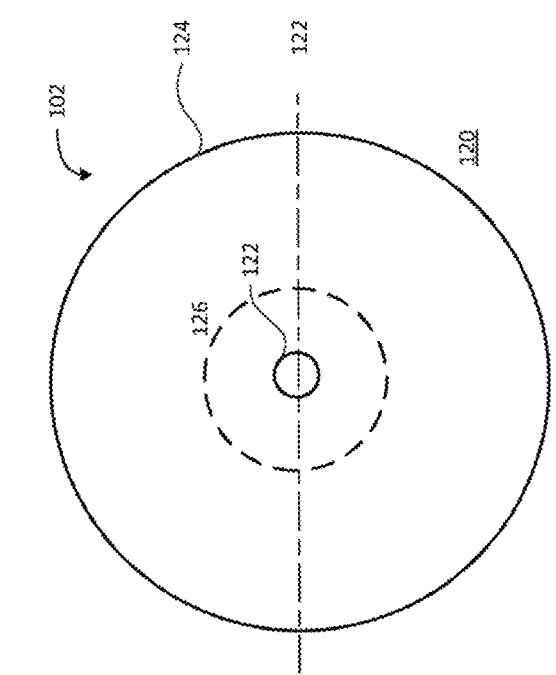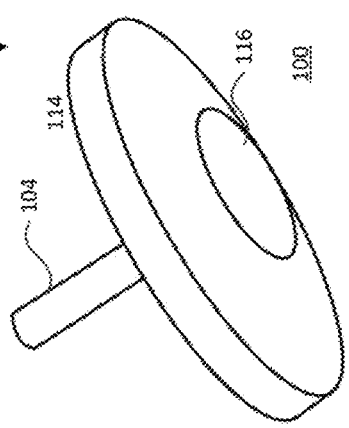

VARIABLE MAGNETIC BREAK-AWAY MOUNTING MECHANISM

CROSS REFERENCE TO RELATED APPLICATIONS

The present application is a continuation of U.S. patent application Ser. No. 14/526,947, filed Oct. 29, 2014, which claims the benefit of the filing date of U.S. Provisional Patent Application No. 61/989,798 filed May 7, 2014, the disclosures of which are hereby incorporated herein by reference.

BACKGROUND

Various vehicles may have one or more outwardly protruding mechanical parts, such as side view mirrors, rigidly connected to mounting surfaces of the vehicle. Such parts may pose collision risks that could result in damage to the mechanical part itself or an object striking it. For instance, in the example of a side view mirror rigidly connected to a vehicle, in the event of a collision, the rigidity of the connection may greatly increase the force of impact on the mirror as well as a person or an object hitting it.

Safety devices, such as shear pins, may be designed such that the device fractures when an applied force exceeds a predetermined force. The fracturing, in turn, breaks the connection between two or more mechanical parts. Mechanical parts connected together by a detent hinge, for example, are designed to resist rotation about the hinge and remain in a stationary position until an applied torque to one of the mechanical parts exceeds a predetermined torque. When this happens, the parts rotate relative to each other.

BRIEF SUMMARY

One aspect of the disclosure provides an apparatus, which comprises a first component having a circular opening with an interior chamfered edge. The first component has a circular bottom surface within the opening and below the chamfered edge. The apparatus also comprises a second component positioned within the circular opening and the second component has a circular base. The second component further includes a side surface adjacent to the circular based and its side surface being complementary in shape to the internal chamfered edge. Further, the apparatus comprises a magnetic feature adjacent to the circular bottom surface. The magnetic feature provides a magnetic pull force in a first direction to secure the second component within the circular opening while allowing the second component to rotate within the circular opening, and the second component is configured to break away from the magnetic pull force when a contact force applied to the second component in a second direction is greater than a threshold force.

Another aspect of the disclosure provides a system, which comprises a first component having a circular opening with an interior chamfered edge. The first component has a circular bottom surface within the opening and below the chamfered edge. The system also comprises a second component positioned within the circular opening and the second component has a circular base. The second component further includes a side surface adjacent to the circular based and its side surface being complementary in shape to the internal chamfered edge. Further, the system comprises a mirror component coupled to the second component and a magnetic feature adjacent to the circular bottom surface. The magnetic feature provides a magnetic pull force in a first direction to secure the second component within the circular opening while allowing the second component to rotate within the circular opening, and the second component is configured to break away from the magnetic pull force when a contact force applied to the second component in a second direction is greater than a threshold force. The first component, the second component, and the mirror component of the system may be arranged as a side view of a vehicle.

BRIEF DESCRIPTION OF THE DRAWINGS

FIG. 1 is an isometric view of a component interface in accordance with aspects of the disclosure.

FIG. 1A is a top view of the component interface of FIG. 1 in accordance with aspects of the disclosure.

FIG. 1B is a cross-sectional side view of the component interface of FIG. 1 in accordance with aspects of the disclosure.

FIG. 1C is another side view of the component interface of FIG. 1 in accordance with aspects of the disclosure.

DETAILED DESCRIPTION

Figure 2C:
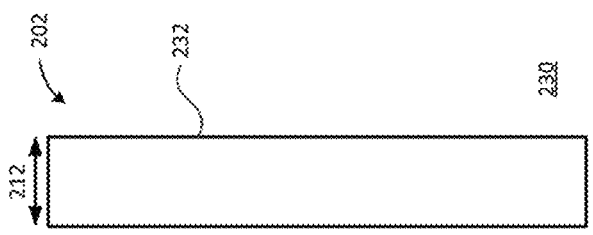
FIG. 2C is another side view of the base structure of FIG. 2 in accordance with aspects of the disclosure.

The technology generally relates to a breakaway safety feature that may be used, for example, with a vehicle. Specifically, the safety feature may include a hinge mechanism having a component interface secured in an angled pocket of a base structure by a magnetic pull force. Thus, the safety feature may include a feature which provides the magnetic pull force, a nestled design which allows for shearing of the component interface at a given force, and retraining features such as shape or other devices that prevent the component interface from shearing when the given force has not been reached. The nature of these retraining features may vary depending upon the application and loading cases expected.

The safety feature may be designed so that the component interface moves about the base in various degrees of freedom and/or breaks away from the base when contacted by another object from any direction as a universal hinge mechanism. As an example, if the universal hinge mechanism is incorporated into a vehicle, such as a side view mirror, the object may include a person or other object external to the vehicle. In that regard, this configuration may prevent or reduce potential damage to the component interface as well as the person or other object if there is contact or collision.

The component interface may have geometric features complementary in shape to the geometric features of the base structure. For example, the base structure and the component interface may be circular in shape. In one instance, a base structure may be arranged with an angled or a chamfered pocket with a flat bottom. The depth of the pocket may vary depending on its corresponding pocket angle (relative to the flat bottom). In that regard, greater the pocket angle, the greater the slope of the chamfer.

One or more materials with magnetic permeability, e.g., a permanent magnet or an electromagnet, may be positioned at the flat bottom of the pocket. In some examples, the one or more magnets may be positioned within a recess of the flat bottom and may or may not be concentric to the angled pocket. The one or more magnets may thus provide a pull force that holds or secures the component interface together. Thus, the component interface may be restrained laterally by the angled pocket. A magnetic gap (which theoretically can be zero) may be formed between the base structure and the component interface. This gap may be varied in order to modify the pull force of the one or more magnets. The magnetic gap may allow the component interface to move in multiple directions, and thus allowing for "universal" movement of the universal hinge mechanism. Moreover, a second slot feature, which may be relatively smaller than the angled pocket, may be configured anywhere on the base structure to restrain the component interface rotationally.

In some examples, rather than being free to rotate 360 degrees within the base structure, the component interface may include one or more constraining features. In one example, the component interface may include a protruding feature which when positioned within a slot of the base structure, prevents the component interface from rotating completely freely within the base structure. Alternatively, the component interface may not be entirely circular. Instead, it may have a generally circular shape with a straight edge on at least a portion of the base structure. In this regard, the straight edge may also interfere with the interior chamfered edge in order to prevent the component interface from rotating completely freely within the base structure. The location of this constraining feature may impact the ability of the component interface to resist torsion.

When the component interface is struck from a particular direction with sufficient force, the component interface may move in certain directions relative to the base structure. The movement may be lateral or angular depending on how the force is applied. By way of example only, the component interface may be struck from a lateral direction with sufficient force to cause the component interface to break away from the magnetic pull force of the base structure. The force required for the component interface to break away from the magnetic pull force may be called the magnetic break-away threshold. The overall design of the present technology allows the mechanism to work similarly across all impact scenarios regardless of orientation or direction.

Various design features of the universal hinge mechanism may allow for high levels of modularity, customizability, and tuning. Design features such as the overall circular design, magnetic pull, magnetic gap, pocket depth, pocket angles, slope of the chamfers, and the coefficient of friction between the component interface and the base structure may all be tuned and modified to achieve particular design objectives. Further, the use of one or more electromagnets may provide a more tunable magnetic pull force at the bottom of the base structure and provide a customizable magnetic break-away threshold based on the design objectives above. For instances when the component interface becomes fully detached, a tether may be used so that it does not get lost.

As an example, the universal hinge mechanism may be used as part of a side view mirror of a vehicle, such as an autonomous vehicle. Thus, in one scenario, a person, such as a cyclist or pedestrian, traveling on the side of a road may accidentally collide with the component interface of the universal hinge mechanism when used as part of a side view mirror of the autonomous vehicle. Due to the component interface's freedom of movement relative to the base structure and ability to break-away upon impact, the damage/injury to both the person and the side view mirror may be significantly reduced even though the contact force may not be perfectly normal to the hinge mechanism. However, the technology does not have to be limited to just autonomous vehicles. It may be applicable in any scenario where a customizable breakaway mechanism is desired or necessary.

However, the technology is not limited to use with side view mirrors for autonomous vehicles. It may be applicable in any scenario where a customizable breakaway mechanism is desired or necessary. Further, while certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

FIG. 1 is an isometric view 100 of a component interface 102 in accordance with one aspect of the disclosure. As shown, the component interface 102 is conical in shape and tappers down from top surface 114 to bottom surface 116. While certain aspects of the disclosure are particularly useful in connection with specific types of shapes, the component interface 102 may be any type of three-dimensional shape including, but not limited to, a sphere, cylinder, cuboid, hexagonal prism, square-based pyramid, triangular-based pyramid, cube, triangular prism, etc.

The component interface 102 also includes a cylindrical body 104, which may accommodate or connect to an auxiliary mechanical component (not shown), such as a mirror element, when the component interface 102 is use as part of a side view mirror of a vehicle. The cylindrical body 104 may be arranged on the component interface 102, or may extend out as one continuous piece of the component interface. Although cylindrical body 104 is illustrated as a cylinder, it may be any geometric shape capable of accommodating or connecting an auxiliary mechanical component. Moreover, the component interface 102 and cylindrical body 104 may be composed of the same material, such as aluminum, steel, plastics, rubber, etc., or may be composed of different materials based on particular design and/or safety objectives, as will be further described with regard to FIG. 3.

FIG. 1A is a top view 120 of the component interface 102. From top view 120, the shape of the component interface 102 is represented by three different circles. Because the component interface 102 is circular in shape, it includes a circumference 124. In addition the cylindrical body 104 is represented by circle 122, which is visible from top view 120. The bottom surface 116 of the component interface 102 is represented by circle 126, but shown in dashed line because bottom surface 116 is below the top surface 114. Moreover, line 122 is a plane through the component interface 102, which creates a cross-sectional side view of the component interface 102.

FIG. 1B is a cross-sectional side view 110 of the component interface 102 through line 122 of FIG. 1A. As shown in view 110, the cylindrical body 104 is shown as a rectangle extending upward to a length 112 from the top surface 114 of the component interface 102 to form an upside-down "T" configuration. In addition, component interface 102 includes the bottom surface 116 and two angled side surfaces 118. The component interface also includes a magnetic portion 119 having magnetic permeability that is configured to interact with one or more magnetic components of a base structure, as will be further discussed below with regard to FIG. 2. The magnetic portion 119 may be of any ferrous or magnetic material, and represented by the hatching pattern as shown. The magnetic portion 119 may be arranged anywhere on or within the component interface 102. For instance, the magnetic portion 119 may be internal to the component interface 102, or it may be fully or partially exposed along the bottom surface 116 and angled side surfaces 118. In addition, the magnetic portion 119 may or may not be concentric to the angled pocket. However, it may be desirable to arrange the magnetic portion along the bottom surface 116 and angled side surfaces 118 since those surfaces interface with the base structure.

FIG. 1C is another side view 130 of the component interface 102. As shown, top surface 114 and bottom surface 116 may be flat and parallel or generally parallel to each other. Moreover, the angled side surfaces 118 form angles 132 and 134 relative to an imaginary line 136 extending vertically in both directions. The angles 132 and 134 illustrated in this example are equivalent. However, these angles may be different from each other based on desired configuration and design of its corresponding base structure. The magnetic portion 119 shown in FIG. 1A is not depicted in FIG. 1C since side view 130 is not a cross section.

Figure 2:
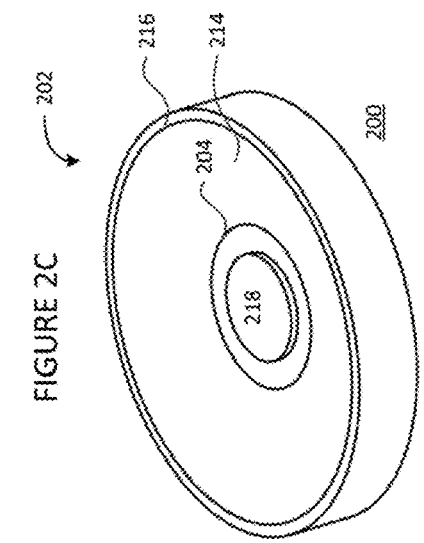
FIG. 2 is an isometric view of a base structure in accordance with aspects of the disclosure.

FIG. 2 is an isometric view 200 of a base structure 202. The base structure 202 includes a circular opening with a top surface 216 and a chamfered pocket with an interior chamfered 214 and a bottom surface 204 configured to engage with bottom surface 116 and the two angled side surfaces 118 of the component interface 102. The bottom surface 204 of the chamfered pocket also includes a material with magnetic permeability, such as a magnet 218. In this example, the chamfered pocket is bowl shaped and configured to complement the angled side surfaces 118 of FIG. 1B. Although FIG. 2 depicts a base structure that is symmetrical in configuration to component interface 102, the base structure 202 may comprise any three-dimensional geometric shape and may be complementary to the three-dimensional geometric shape of the component interface 102. In addition, the base structure 202 may be composed of the same material as component interface 102, or may be composed of different material based on certain design and/or safety objectives, as noted above with regard to FIG. 1.

Figure 2A:
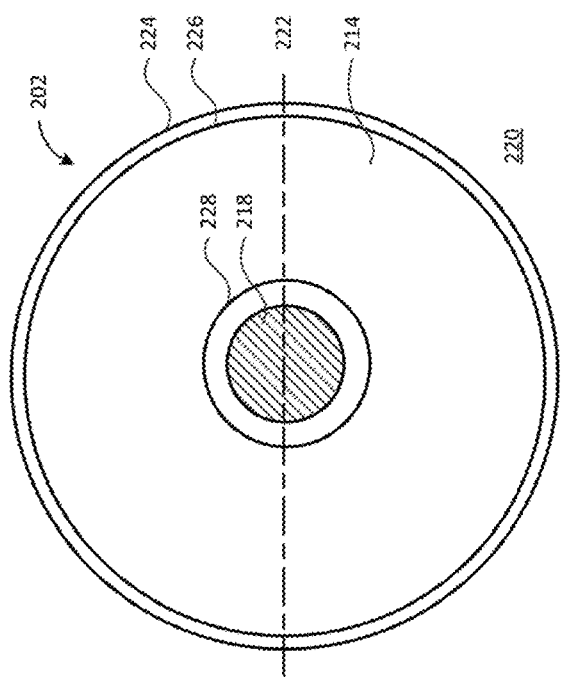
FIG. 2A is a top view of the base structure of FIG. 2 in accordance with aspects of the disclosure.

FIG. 2A is a top view 220 of the base structure 202. Similar to the component interface of FIG. 1A, the base structure 202 has an outer circumference 224. The inner edge of top surface 216 is represented by inner circumference 226. In that regard, the top surface 216 shown in FIG. 2 is depicted by the area between outer circumference 224 and inner circumference 226 in FIG. 2A. Similarly, the interior chamfered edge 214 is depicted by the area between inner circumference 226 and circle 228, which represents the outer edge of bottom surface 204. Further, the magnet 218 is represented by a hatched circle 218. Line 222 is a plane through the base structure 202, which creates a cross-sectional side view of the base structure.

Figure 2B:
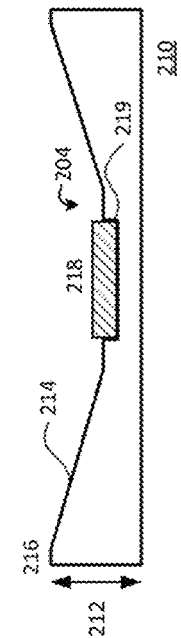
FIG. 2B is a cross-sectional side view of the base structure of FIG. 2 in accordance with aspects of the disclosure.

FIG. 2B is a cross-sectional front view of the base structure 202 through line 222 of FIG. 2A. As shown, base structure 202 includes a height 212 and the interior chamfered edge 214 sloping downward from top surface 216 to the bottom surface 204. The bottom surface 204 may be flat or relatively flat. The bottom surface also includes recess 219. A material with magnetic permeability, such as the magnet 218, may be positioned within the recess 219. FIG. 2B depicts the magnet 218 raised above bottom surface 204 based on the depth of the recess 219. However, in other aspects, the magnet 218 may be positioned below or in level with bottom surface 204 based on the depth of the recess 219.

FIG. 2C is a side view 230 of the base structure 202. Because view 230 is not a cross-sectional view, the side of base structure 202 is represented by a rectangle 232 in this example. Moreover, the height 212 of base structure 202 is depicted as the width of rectangle 232 in side view 230. Similarly, the diameter of outer circumference 224 is depicted as the length of rectangle 232 in side view 230.

Figure 3:
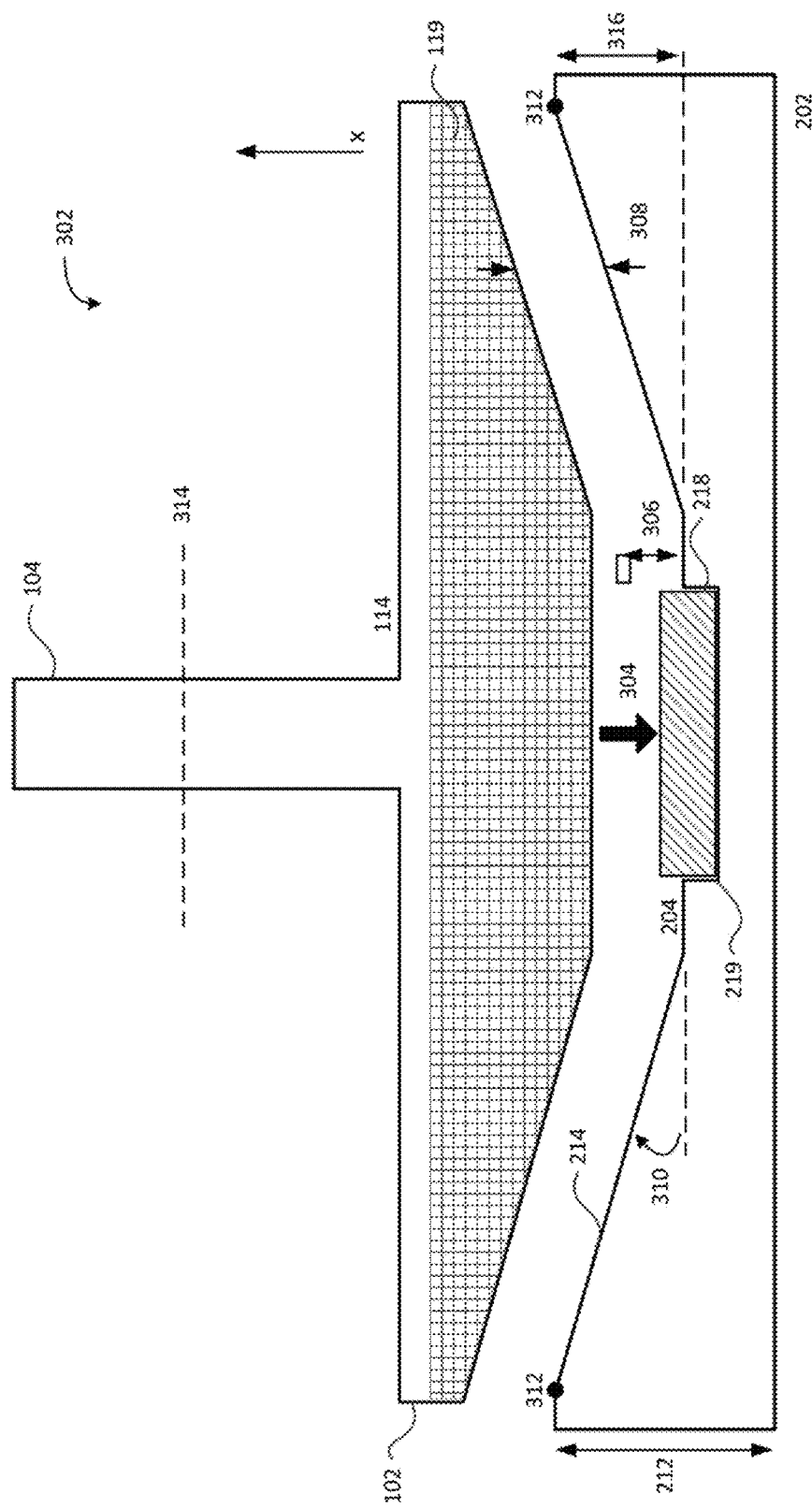
FIG. 3 is a cross-sectional side view of a universal hinge mechanism in accordance with aspects of the disclosure.

FIG. 3 is a cross-sectional front view 300 of a universal hinge mechanism 302 in accordance with one aspect of the disclosure. The universal hinge mechanism 302 comprises component interface 102 and base structure 202. Both the component interface 102 and base structure 202 may be configured to have complementary shapes such that the component interface may sit at least partially within the chamfered pocket of the base structure. In front view 300, the conical design of component interface 102 allows it to nest within the conical design of base structure 202. In addition to the depicted nesting configuration, a magnetic pull force (shown as arrow 304) interacting between the magnetic portion 119 and magnet 218 secures the component interface 102 within base structure 202.

As explained above with regard to FIG. 1, cylindrical body 104 may accommodate or connect to an auxiliary mechanical component, such as a side view mirror of a vehicle. In one illustrative example, when the cylindrical body 104 incurs an impact force, the impact force would strike the cylindrical body 104 at a particular distance, such as a distance 314, from the top surface 114 of component interface 102 (or from the base of cylindrical body 104). This distance is denoted by variable "x," in conjunction with an arrow pointing upward as shown. The manner in which the component interface 102 may detach from base structure 202 will depend on whether the impact force is exerted above or below distance 314, which will be further described below with regard to FIGS. 5-7.

The nesting configuration depicted in FIG. 3 is an example of a design feature that allows the component interface 102 to move freely relative to the base structure 202. For example, when any part of the component interface 102 is struck from a particular direction with sufficient force, the component interface 102 may move in certain directions relative to the base structure 202. The movement may be lateral or angular relative to the base structure 202 depending on how the force is applied. As further discussed below with regard to FIGS. 5 and 6, the component interface may be struck from a lateral direction with sufficient force to cause the component interface 102 to break away from the magnetic pull force 304 of magnet 218 within the recess of base structure 202. The force required for the component interface 102 to break away from magnetic pull force 304 may be called a magnetic break-away threshold. Therefore, the overall design of the present technology allows the mechanism to work similarly across all impact scenarios regardless of orientation or direction.

As noted above, various design features of the universal hinge mechanism 302 may allow for modularity, customizability, and tuning of the universal hinge mechanism 302. Design features such as the overall circular design, magnetic pull, magnetic gap, pocket angles, pocket depth(s), slope of the chamfered edges, pivot point(s), and the coefficient of friction between the component interface and the base structure may all be tuned and modified to achieve particular design objectives. In other words, the sizes and locations of these features relative to one another may be varied which can impact the break-away threshold. For instance, the distances between these features can create a series of moment arms. By way of example only, height 212 of the base structure 202 may be increased to steepen or decreased to reduce the slope of the interior chamfered edge 214. Alternatively, pocket depth 316 may be increased or decreased by adjusting angle 310. In addition, the design features of the universal hinge mechanism 302 may also be tuned locally within the component interface 102 or the base structure 202 to achieve different types of behavior based on the orientation of the contact force.

A universal hinge mechanism's overall geometric design may be customized to achieve various design and/or safety objectives. For instance, the overall conical and/or circular design of component interface 102 and base structure 202 may be tailored to meet a particular weight requirement. As an illustrative example, a weight of an auxiliary mechanical component that can be coupled to cylindrical body 104 of component interface 102 may be heavy. Therefore, it may be desirable to configure the component interface and the base structure with a relatively large conical (e.g., a greater diameter) design to account for and sustain the overall weight of the auxiliary mechanical component and component interface 102.

The universal hinge mechanism 302's magnetic pull force may also be tuned to meet different design and/or safety objectives. For example, the magnetic pull force 304 of the universal hinge mechanism 302 may be tuned to vary the force or magnetic break-away threshold required to break the connection between component interface 102 and base structure 202. As an example, magnet 218 may be a permanent magnet selected to meet a predetermined magnetic break-away threshold. Generally, permanent magnets comprise materials that, when magnetized, retain a certain level of magnetism. These materials may include, but are not limited to, Neodymium Iron Boron (NdFeB or NIB), Samarium Cobalt (SmCo), Alnico, Ceramic, Ferrite. In addition, the strength of magnetism may vary based on the physical size of the permanent magnets, temperature, etc.

In an alternative example, the magnet 218 may be an electromagnet. An electromagnet may include a tightly wound coil of wire around material having ferrous properties, such as an iron core, and behaves like a permanent magnet when electrical current flows through the wire. The strength of the magnetic field of electromagnets may be adjusted by changing the amount of current. In that regard, the use of one or more electromagnets may provide a tunable magnetic pull force at the bottom surface 204 of base structure 202 and allow for customization of the magnetic break-away threshold. An electromagnet may also be tuned to magnetically levitate the component interface 102 to provide the component interface additional room to move about the base structure 202 in the event it sustains an impact.

Structural gaps formed between the components of a universal hinge mechanism may also be customized to advance certain design and/or safety objectives. This gap may be varied in order to modify the pull force of the one or more magnets By way of example only, a gap 306 formed between an engaged component interface 102 with base structure 202 of break-away mounting mechanism 302 can be increased or decreased to respectively increase or decrease room for the component interface 102 to move about the base structure 202. As depicted, gap 306 may be a magnetic gap formed if the magnet 218 is raised to a certain height above the bottom surface 204 based on the depth of recess 219. This raised feature of the magnet 218 creates the gap 306 between the component interface 102 and the base structure 202.

This magnetic gap may be varied in order to modify the pull force of the one or more magnets. Referring back to FIG. 2B, one example approach to adjusting gap 306 of FIG. 3 is to raise or lower magnet 218's position within its recess at the bottom surface 204. In this regard, if component interface 102 sustains an impact at a non-perpendicular angle to cylindrical body 104, the component interface is left with sufficient room formed by gap 306 to move about the base structure 202. In an alternative scenario, the gap 306 may zero, if for instance, magnet 218 is either level with or below bottom surface 204.

Pivot point(s) of a universal hinge mechanism may also be customized to further attain various design and/or safety objectives. As will be further discussed below with regard to FIGS. 4 and 5, a pivot point may be a central point at which the component interface 102 turns or oscillates when a force is applied thereto. As such, the customization of pivot points may ultimately determine where and how the component interface 102 will detach. Although only two pivot points, e.g., pivot points 312 along an edge of the chamfer, is shown in FIG. 3, a universal hinge mechanism may include an infinite number of pivot points along the circular edge of the chamfer.

Coefficient of friction values between components of a universal hinge mechanism may also be customized or tuned by selecting different coating materials in order to achieve various design and/or safety goals. A coefficient of friction value describes the ratio of the force of friction between two components and the force pressing them together. Thus, coefficient of friction values may primarily depend on at least two factors: material composition and the interaction of materials. Other factors, such as temperature, atmospheric conditions, weather, etc., may also affect these values. In one illustrative example, the interaction of rubber on rubber has an approximate coefficient of friction value of 1.16. In another example, the interaction of brass on steel has an approximate coefficient of friction value of 0.35. In this regard, the degree of friction between two materials is associated with respective coefficient of friction values. If the bottom surface 116 and angled side surfaces 118 of the component interface 102, and the chamfered edge surfaces 214 and bottom surface 204 of the base structure 202 are coated with rubber or a rubber-like material, for instance, the coefficient of friction between them will be relatively high, as noted above. Thus, the component interface 102's ability to slide, glide, or move about the base structure 202 may be limited due to the high level of friction between these features.

Figure 4:
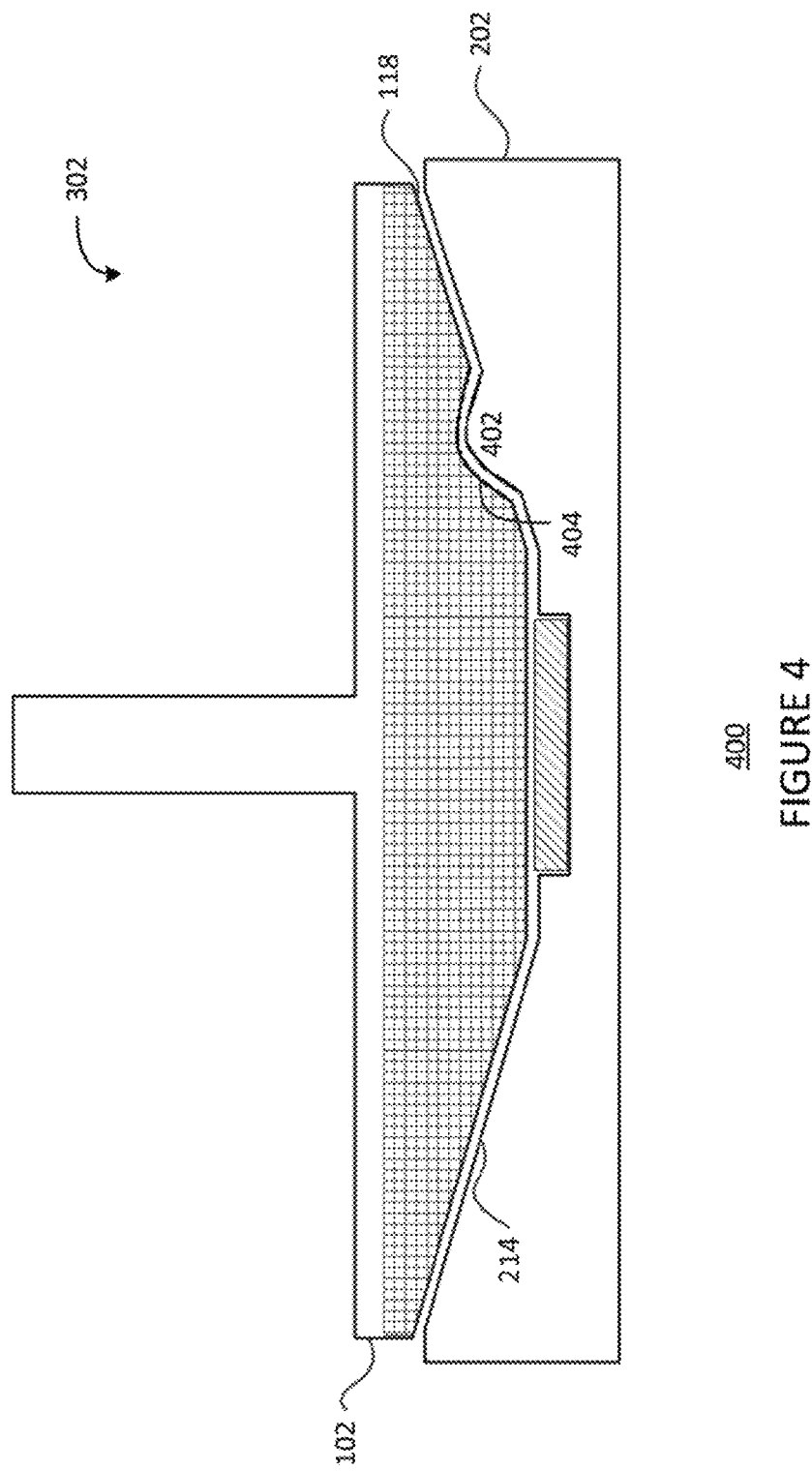
FIG. 4 is a cross-sectional side view of a universal hinge mechanism with a rotational constraint in accordance with aspects of the disclosure.

In some examples, the universal hinge mechanism may be configured with a constraining feature to limit rotation of the component interface 102 about the base structure 202. FIG. 4 is a cross-sectional front view 400 of the universal hinge mechanism 302 with a rotational constraint. As shown, a constraint element 402 is arranged on chamfered edge 214 of the base structure 202. The constraint element 402 is positioned within a channel 404 that may be carved out of the angled side surfaces 118. In this regard, the engagement between constraint element 402 and channel 404 constrains the component interface 102 from rotating 360 degrees about the base structure 202 when a contact force is applied in such a manner. While FIG. 4 shows one constraint element 402 arranged on the chamfered edge 214 of base structure 202 and the channel 404 carved out of the angled side surfaces 118, one or more rotational constraints may be arranged or configured anywhere on the universal hinge mechanism 302, as appropriate. Further, in another example, the constraint element 402 may be arranged on the component interface 102 and the channel 404 on the base structure 202. The location of this constraining feature may impact the ability of the component interface to resist torsion.

As described above, a striking object may exert a contact force to the component interface 102. Depending on the magnitude, angle and direction of an applied contact force, the component interface 102 may move within the chamfered pocket of base structure 202, or the component interface 102 may break away from base structure 202 in a direction relative to the contact force. Moreover, as will be further discussed below with regard to FIGS. 5-7, there may be at least two ways in which the component interface 102 can break away from the magnetic pull force 304 from magnet 218 of base structure 202.

Figure 5:
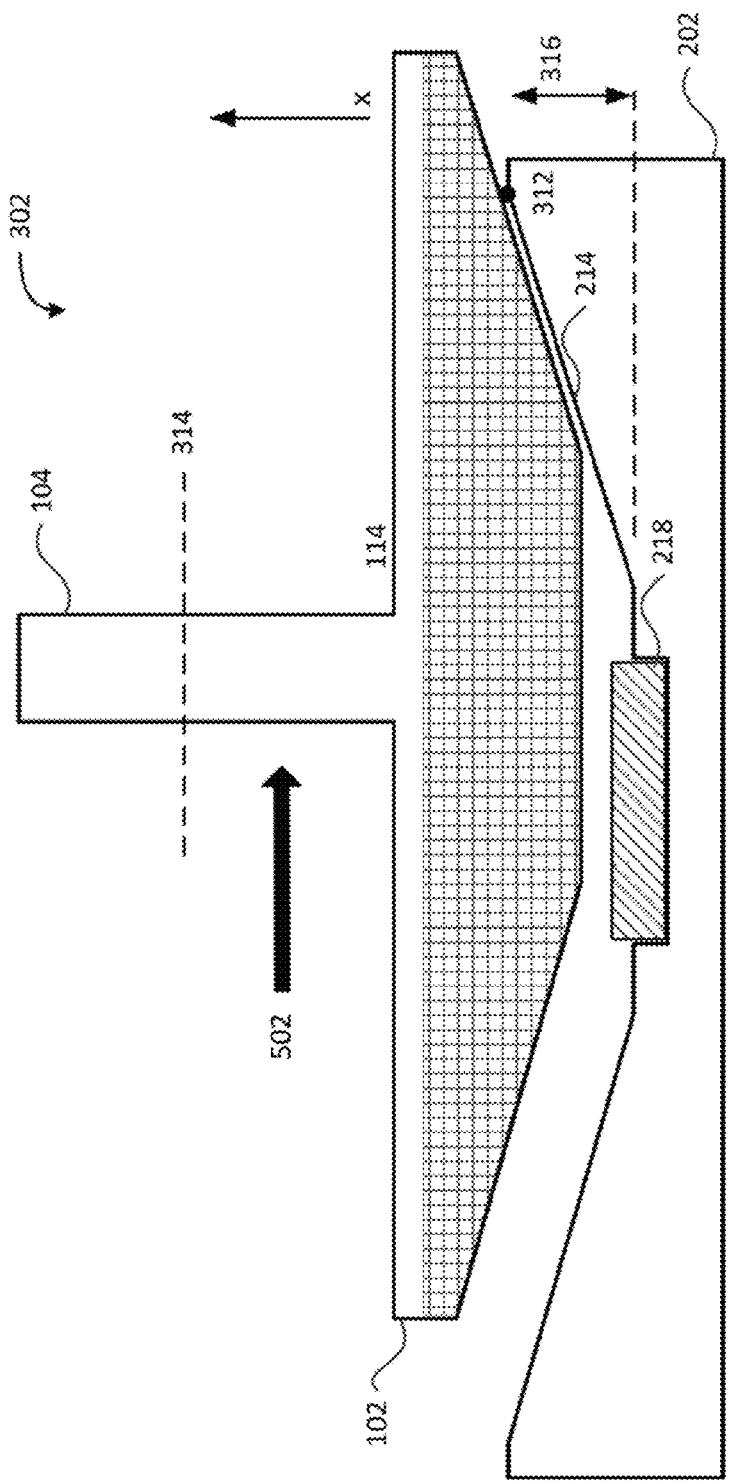
FIG. 5 is a diagram depicting a contact force applied to the universal hinge mechanism of FIG. 3 in accordance with aspects of the disclosure.

FIG. 5 is a diagram 500 illustrating a contact force applied to the universal hinge mechanism of FIG. 3 in accordance with aspects of the disclosure. In this example, a contact force 502 that is perpendicular to the magnetic pull force of magnet 218 and having a magnitude strong enough to break the pull force is exerted below distance 314 on cylindrical body 104 and closer to top surface 114 of the component interface 102. When this occurs, the component interface 102 may displace laterally, or shear, as shown in FIG. 5. In this example, the magnitude of contact force (shown by arrow 502) may be sufficient to break the magnetic pull force originating from magnet 218. However, whether or not the component interface 102 completely detaches from base structure 202 may depend on one or more of the restraining features described above, such as the overall circular design of the universal hinge mechanism 302, magnetic pull force, magnetic gap, pocket angles, pocket depth(s), slope of the chamfered edges, pivot point(s), and the coefficient of friction between the component interface 102 and the base structure 202. Moreover, the magnetic attachment between magnet 218 and the component interface 102 may be configured in a manner such that once separation is created, the attachment/attraction force decreases exponentially. In other words, the magnetic field may be inversely proportional to the cube of the separation distance.

In one instance, an impact force may cause the component interface 102 to shear, but one or more design features of the universal hinge mechanism 302 may prevent the component interface 102 from completely detaching. By way of example, the pocket depth 316 may be deep enough to prevent the component interface 102 from sliding off the chamfered edge 214. In addition, the coefficient of friction between component interface 102 and base structure 202 may be high enough to prevent the component interface from sliding off the chamfered edge 214. In that regard, the magnetic pull force of magnet 218 may pull the component interface 102 back into its original nesting configuration, as described above.

In another instance, an impact force may cause the component interface 102 to shear and break away from the base structure 202. In one break-away scenario, the impact force 502 may be of sufficient magnitude to cause the component interface 102 to shear and subsequently slide off the chamfered edge 214.

Figure 6:
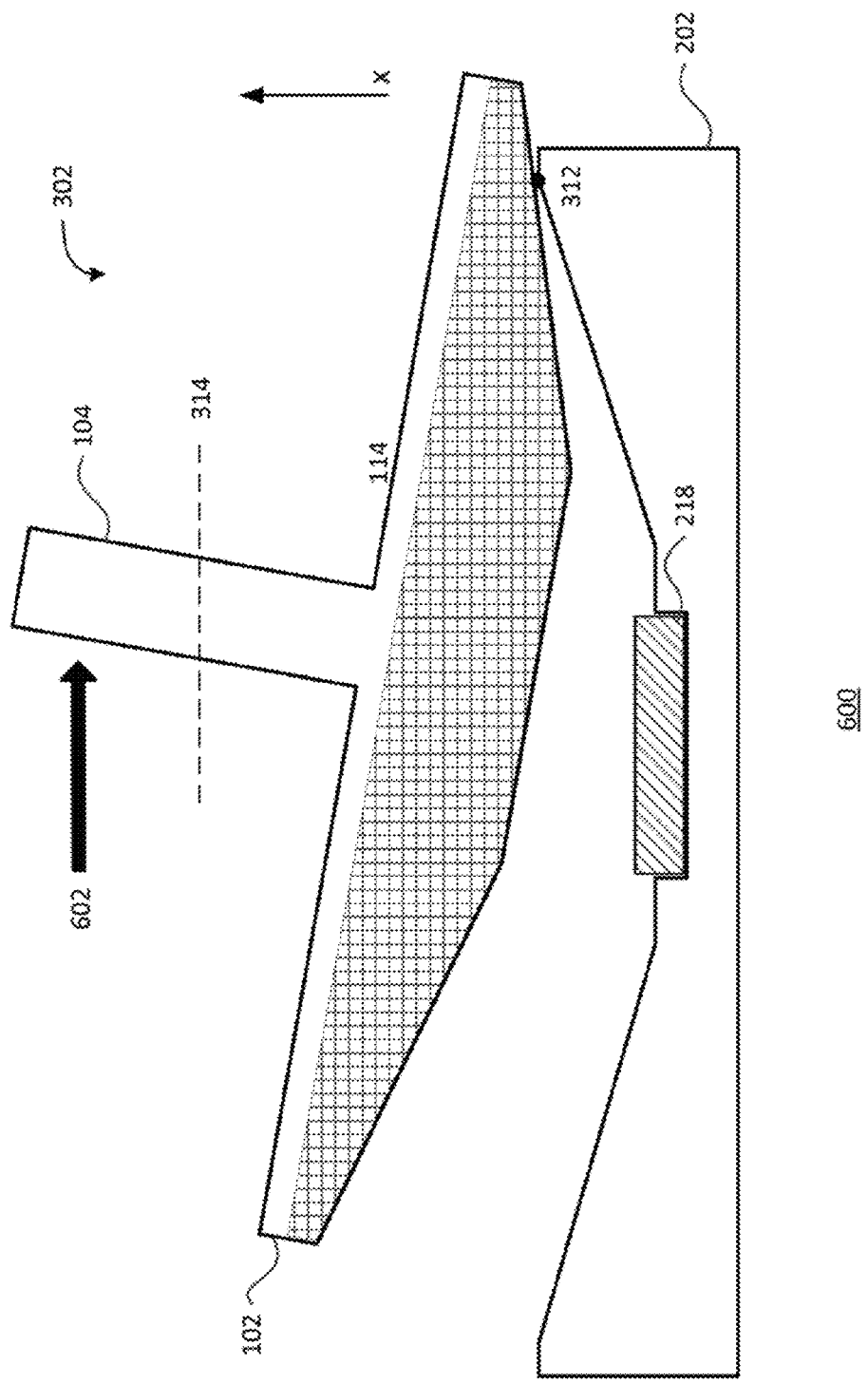
FIG. 6 is a diagram depicting a contact force applied to the universal hinge mechanism mounting mechanism of FIG. 3 in accordance with aspects of the disclosure.

FIG. 6 is a diagram 600 depicting a contact force applied to the universal hinge mechanism of FIG. 3 in accordance with aspects of the disclosure. By way of example only, a contact force 602 with a magnitude sufficient to break the magnetic pull force of magnet 218 is exerted above distance 314 on cylindrical body 104 and closer to the top portion of cylindrical body 104. Because of the contact force 602's relative position on the cylindrical body 104, the component interface 102 displaces rotationally, or torques, about pivot point 312. As will be further discussed below with regard to FIG. 7, the magnitude of the contact force necessary to cause the component interface 102 to torque about pivot point 312 decreases as the distance at which the contact force is applied on the cylindrical body 104 increases, as indicated by direction arrow x in FIG. 6.

Figure 7:
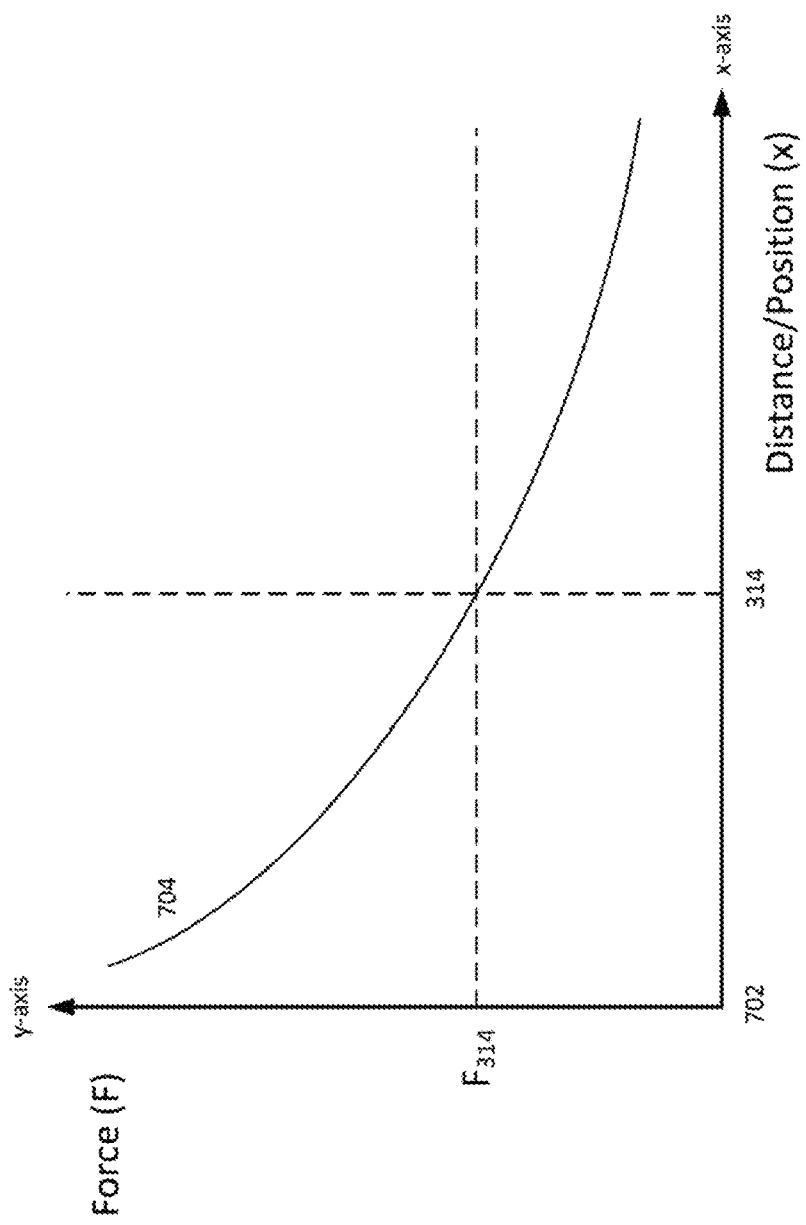
FIG. 7 is a graph depicting a relationship between applied contact force to a component interface and position of the applied contact force in accordance with aspects of the disclosure.

FIG. 7 is a graph 700 depicting a relationship between applied contact force to a component interface and distance/position of the applied contact force relative to the cylindrical body 104 in accordance with aspects of the disclosure. By way of example only, graph 700 shows an inverse-logarithmic relationship 704 between applied contact force and distance of the applied contact force from the top surface 114 of the component interface 102, as depicted in FIGS. 5 and 6. In other words, as the distance of the applied contact force from the top surface 114 increases in the direction of direction arrow x of FIGS. 5 and 6, the magnitude of force necessary to break the magnetic pull force of magnet 218 decreases.

In graph 700, the x-axis and y-axis intersect at origin 702, which represents the force necessary to break the magnetic pull force at the connection point between the top surface 114 of component interface 102 and cylindrical body 104. In this example, distance 314 intersects the inverse-logarithmic relationship 704 at force of F314. As discussed above with regard to FIGS. 5 and 6, a contact force that is applied below distance 314 on the cylindrical body 104 causes the component interface 102 to shear. However, a contact force that is applied above distance 314 on the cylindrical body 104 may cause the component interface 102 to torque. In that regard, graph 700 illustrates that more force is required to cause the component interface to shear, as opposed to torque.

While an inverse-logarithmic relationship between the applied contact force and the distance of the applied contact force is shown in FIG. 7, the force curves and critical distances depend on the design configuration of the break-away mounting mechanism 302, namely the magnetic pull force of the magnet(s), chamfered pocket depth and angles of the component interface and base structure, coefficient of friction, pivot point(s), pivot distances, and the overall shape of the break-away mounting mechanism, as noted above. Thus, for instance, a magnetic pull force tuned differently from the magnetic pull force 304 in FIG. 3 may result in a steeper force curve than the inverse-logarithmic relationship 702 depicted in FIG. 7.

Figure 8:
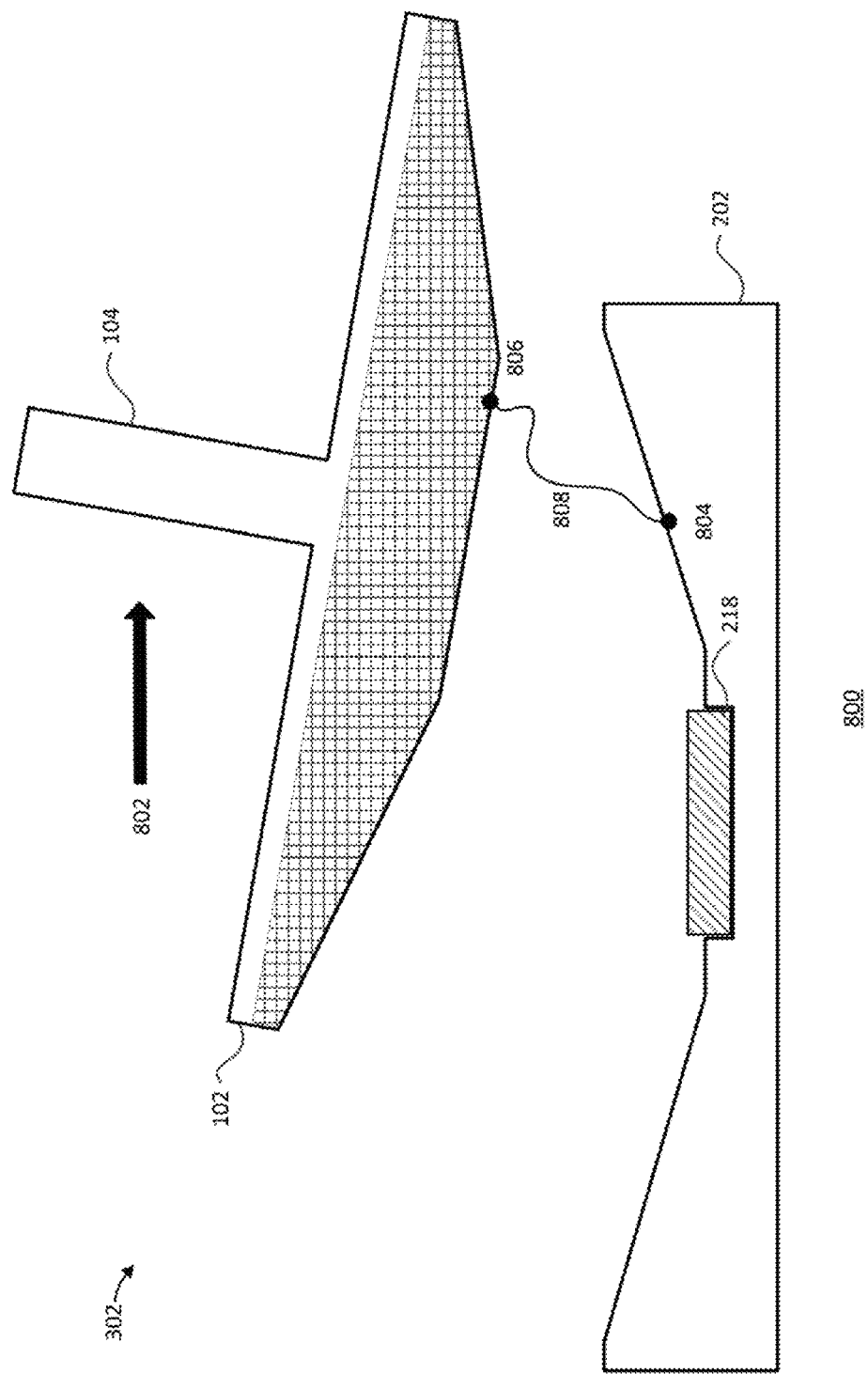
FIG. 8 is a diagram of a universal hinge mechanism with a tether in accordance with aspects of the disclosure.

When the component interface 102 breaks away and completely detaches from base structure 202, it may result in the permanent loss of component interface 102, or even permanent damage. Thus, in some examples, to prevent loss or damage to the component interface 102 when it has broken away from the base 202 structure as described above, a tether or other connection may be used to connect the component interface to the base structure. FIG. 8 is a diagram 800 of a break-away mounting mechanism 302 with a tether 808. Tether 808 may be attached at a connection point 804 on base structure 202 and a connection point 806 on component interface 102. The tether 808 should be strong enough to withstand the contact force as well as the moving weight of the component interface, and may be made from flexible material, such as high density rope, polyethylene, metallic fiber, etc. Thus, when a horizontal contact force 802 is applied to the cylindrical body 104 with a magnitude sufficient to not only break the magnetic pull force of magnet 218, but also sufficient to cause the component interface 102 to break away from base structure 202, tether 808 may prevent loss and/or permanent damage to the component interface 102.

Figure 9:
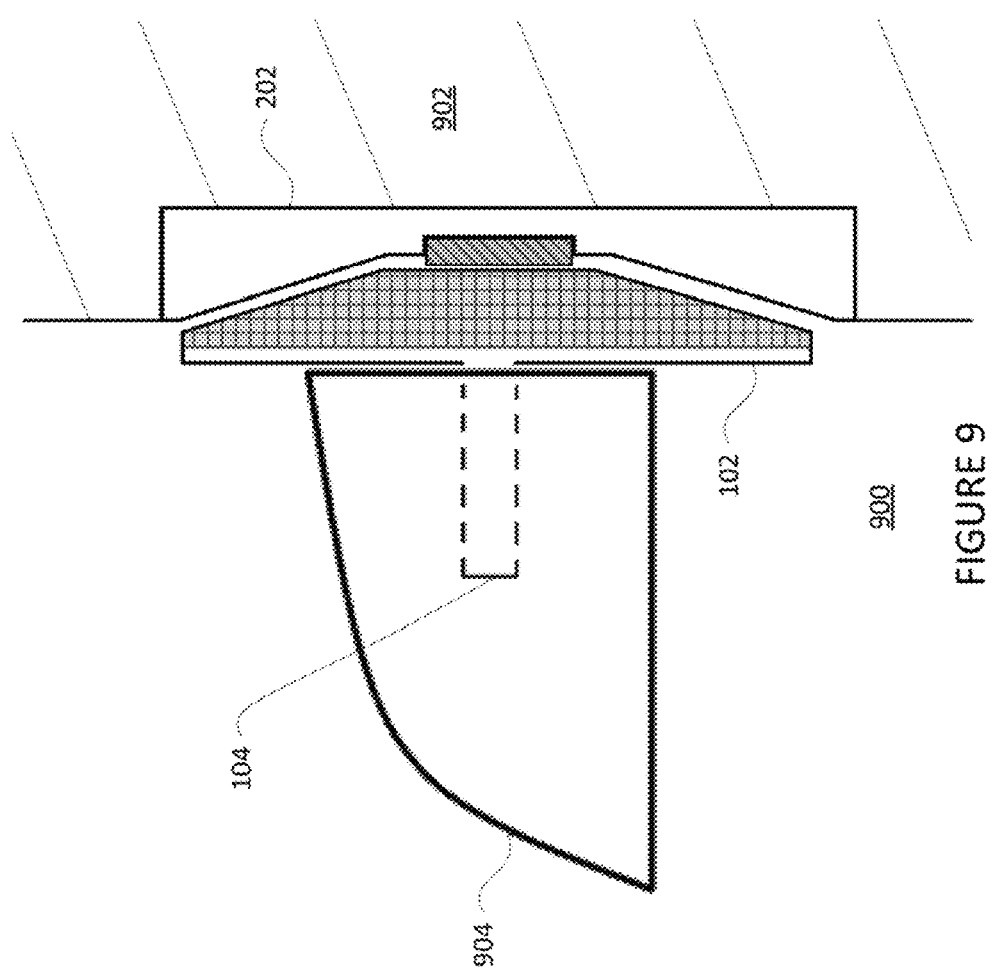
FIG. 9 is an example view of a vehicle in accordance with aspects of the disclosure.

As noted above, the safety feature may be incorporated into a vehicle, and in particular, a side view mirror. FIG. 9 is an example of a top-down partial cross sectional view 900 of a portion of a vehicle 902. The vehicle 902 includes a side view mirror including a side view mirror housing 904 including a mirror (not shown) and the universal hinge mechanism 302. In this example, the base portion 202 is incorporated into a portion of a side of the vehicle 902 such that the cylindrical body 104 and the component interface 102 form a connection between a side view mirror housing 904 of the vehicle 902. The configuration depicted in FIG. 9 allows for the side view mirror housing 904 to sustain a contact force, such as an impact with a pedestrian or other object, and immediately break away from the vehicle 902 as described in the examples above. By doing so, this may reduce the likelihood of harm to the pedestrian or the other object.

Figure 10:
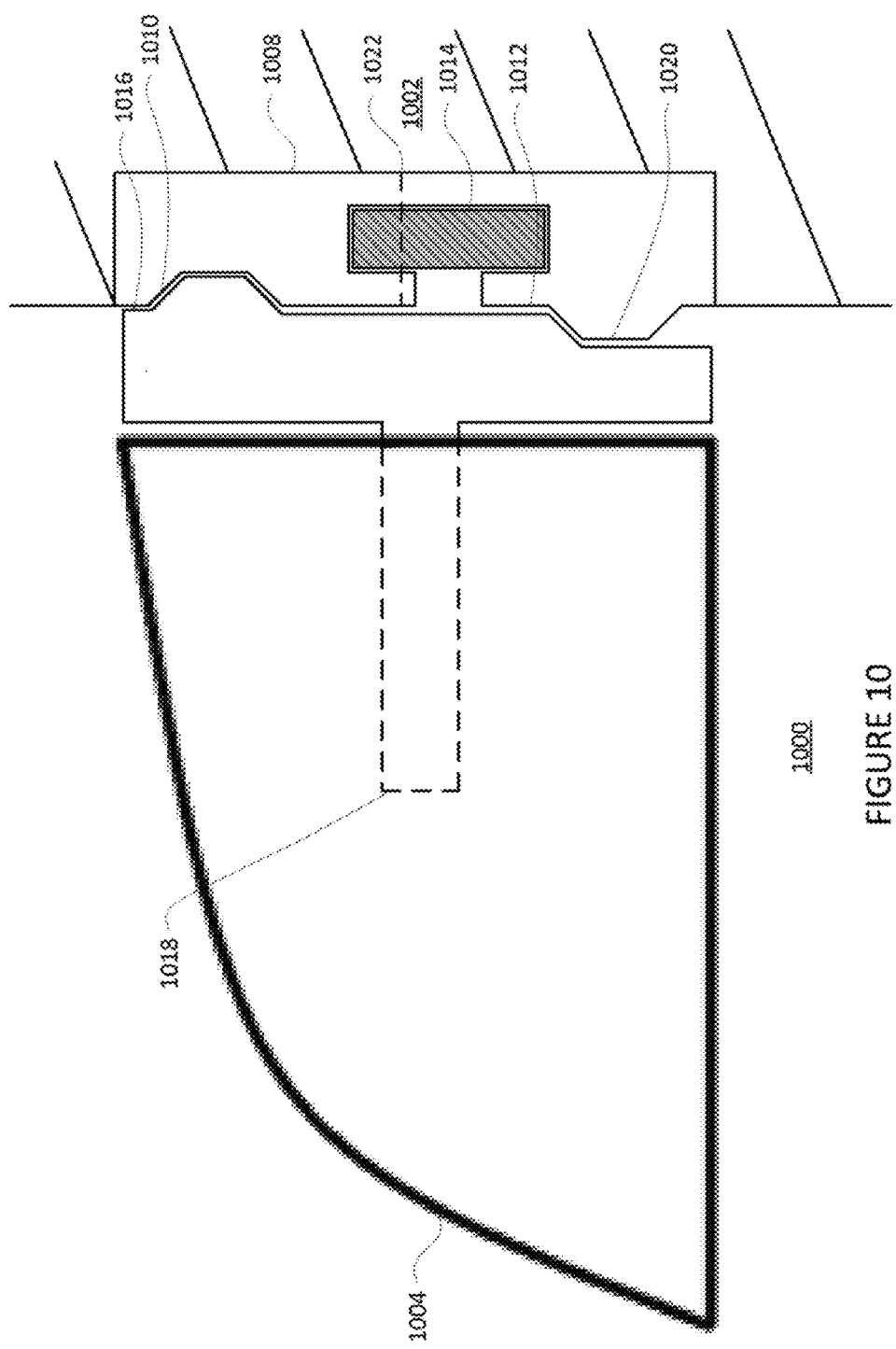
FIG. 10 is another example view of a vehicle in accordance with aspects of the disclosure.

FIG. 10 is an example of a top-down partial cross sectional view 1000 of a portion of a vehicle 1002. The vehicle 1002 includes a side view mirror including a side view mirror housing 1004 including a mirror (not shown) and a universal hinge mechanism 1006. In this example, the base portion 202 is incorporated into a portion of a side of the vehicle 1002 such that the cylindrical body 104 and the component interface 102 form a connection between a side view mirror housing 1004 of the vehicle 1002. The configuration depicted in FIG. 10 allows for the side view mirror housing 1004 to sustain a contact force, such as an impact with a pedestrian or other object, and immediately break away from the vehicle 1002 as described in the examples above. By doing so, this may reduce the likelihood of harm to the pedestrian or the other object.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A side view mirror assembly comprising:
a base component having a recessed area having a shape, the base component having a bottom surface within the recessed area having magnetic properties;
a mirror component positioned within the recessed area, the mirror component having a mirror and a base that is complementary to the shape of the recessed area, the mirror component base having magnetic properties that attract the mirror component base towards the bottom surface thereby securing the mirror component within the recessed area while allowing the mirror component to rotate within the recessed area, and the mirror component being configured to break away from the base component when a contact force applied to the mirror component in a given direction is greater than a threshold force.

2. The assembly of claim 1, wherein the bottom surface includes a recess and a magnetic feature is positioned within the recess in order to provide the magnetic properties to the bottom surface.

3. The assembly of claim 1, further comprising at least one constraint element arranged on the base component which is positioned at least partially within a channel within the mirror base in order to constrain the mirror component interface from rotating 360 degrees.

4. The assembly of claim 1, further comprising at least one constraint element arranged on the mirror component which is positioned at least partially within a channel within the bottom surface of the base component in order to constrain the mirror component interface from rotating 360 degrees.

5. The assembly of claim 1, wherein the bottom surface is flat.

6. The assembly of claim 2, wherein the magnetic feature includes a permanent magnet.

7. The assembly of claim 2, wherein the magnetic feature includes an electromagnet providing a tunable magnetic pull force.

8. The assembly of claim 1, further comprising a gap between a bottom surface of the mirror component and a circular base of the base component.

9. The apparatus of claim 7, wherein a second direction of the contact force is perpendicular to a first direction of the magnetic pull force.

10. The assembly of claim 9, wherein the mirror component is configured to pivot about one or more pivot points on the base component when the contact force is applied to the mirror component at a distance from the magnetic feature.

11. The assembly of claim 9, wherein the mirror component is configured to displace laterally when the contact force is applied to the mirror component at a distance from the magnetic feature.

12. The assembly of claim 11, wherein the mirror component is configured to slide off an interior chamfered edge of the base component when the contact force applied to the mirror component meets a threshold magnitude.

13. The assembly of claim 10, wherein the mirror component is configured to pivot about the one or more pivot points on the base component and detach from the base component when the contact force meets a threshold magnitude.

14. The assembly of claim 1, wherein the base component and mirror component are each conical in shape and have a corresponding conical portion.

15. The assembly of claim 1, wherein the mirror component includes a ferrous material.

16. The assembly of claim 1, further comprising a first coating on the interior chamfered edge and a circular bottom surface of the base component and a second coating on the mirror component base and side surface of the mirror component, such that contact between the first coating and second coating meets a minimum threshold of friction.

17. The assembly of claim 1, further comprising a tether coupled between a first connection point on the base component and a second connection point on the mirror component configured to hold the base component and mirror component together.

18. A vehicle including a side view mirror assembly, the side view mirror assembly comprising:
   a base component having a recessed area having a shape, the base component having a bottom surface within the recessed area having magnetic properties, the base component being incorporated into the vehicle;
   a mirror component positioned within the recessed area, the mirror component having a mirror and a base that is complementary to the shape of the recessed area, the mirror component base having magnetic properties that attract the mirror component base towards the bottom surface thereby securing the mirror component within the recessed area while allowing the mirror component to rotate within the recessed area, and the mirror component being configured to break away from the base component when a contact force applied to the mirror component in a given direction is greater than a threshold force.

19. The vehicle of claim 18, wherein the bottom surface includes a recess and a magnetic feature is positioned within the recess in order to provide the magnetic properties to the bottom surface.

20. The vehicle of claim 18, further comprising at least one constraint element arranged on the base component which is positioned at least partially within a channel within the mirror base in order to constrain the mirror component interface from rotating 360 degrees.

* * * * *